US011197156B2

(12) United States Patent
Cho et al.

(10) Patent No.: US 11,197,156 B2
(45) Date of Patent: Dec. 7, 2021

(54) ELECTRONIC DEVICE, USER TERMINAL APPARATUS, AND CONTROL METHOD THEREOF

(71) Applicant: SAMSUNG ELECTRONICS CO., LTD., Suwon-si (KR)

(72) Inventors: Kyu-hyun Cho, Suwon-si (KR); Sang-young Lee, Anyang-si (KR); Hee-seok Jeong, Suwon-si (KR); Ho-yeon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 75 days.

(21) Appl. No.: 16/205,920

(22) Filed: Nov. 30, 2018

(65) Prior Publication Data
US 2019/0174312 A1    Jun. 6, 2019

(30) Foreign Application Priority Data
Dec. 6, 2017    (KR) .......................... 10-2017-0166928

(51) Int. Cl.
*H04W 12/06*    (2021.01)
*H04L 29/08*    (2006.01)
(Continued)

(52) U.S. Cl.
CPC ............ *H04W 12/06* (2013.01); *H04L 63/08* (2013.01); *H04L 67/1046* (2013.01); *H04W 12/50* (2021.01); *H04W 76/14* (2018.02)

(58) Field of Classification Search
CPC ...... H04W 12/06; H04W 12/003; H04L 63/08
See application file for complete search history.

(56) References Cited

U.S. PATENT DOCUMENTS

| 8,405,729 B2* | 3/2013 | Jain | H04L 63/18 |
| | | | 348/207.1 |
| 8,446,364 B2* | 5/2013 | Solomon | G06F 3/0383 |
| | | | 345/156 |

(Continued)

FOREIGN PATENT DOCUMENTS

| EP | 1233602 A1 | 8/2002 |
| JP | 2016-194756 A | 11/2016 |

(Continued)

OTHER PUBLICATIONS

T. Mantoro, M. A. M. Adnan and M. A. Ayu, "Secured Communication between Mobile Devices and Smart Home Appliances," 2013 International Conference on Advanced Computer Science Applications and Technologies, 2013, pp. 429-434. (Year: 2013).*

(Continued)

*Primary Examiner* — Kari L Schmidt
(74) *Attorney, Agent, or Firm* — Sughrue Mion, PLLC

(57) ABSTRACT

An electronic apparatus is provided. The electronic apparatus according to an exemplary embodiment includes a communicator, a storage, a display, and a processor configured to: based on a connection request signal being received from a user terminal device through the communicator, control to store in the storage a first image output through the display, based on a second image being received from the user terminal device through the communicator, identify a first object included in the stored first image that is same as second object included in the received second image, and based on a determination that a first feature of the first object is same as a second feature of the second object, control the communicator to transmit authentication information corresponding to the connection request signal to the user terminal device.

19 Claims, 13 Drawing Sheets

(51) Int. Cl.
*H04L 29/06* (2006.01)
*H04W 76/14* (2018.01)
*H04W 12/50* (2021.01)

(56) References Cited

U.S. PATENT DOCUMENTS

| | | | |
|---|---|---|---|
| 9,014,685 B2* | 4/2015 | Bathiche | H04B 1/202 |
| | | | 455/420 |
| 9,117,143 B2 | 8/2015 | Atsmon et al. | |
| 9,131,478 B2* | 9/2015 | Dharawat | H04M 1/7253 |
| 10,659,409 B1* | 5/2020 | Collins | H04L 65/4076 |
| 2007/0123166 A1* | 5/2007 | Sheynman | H04W 8/26 |
| | | | 455/41.2 |
| 2011/0138444 A1 | 6/2011 | Kang et al. | |
| 2011/0263202 A1 | 10/2011 | Lee et al. | |
| 2011/0295502 A1* | 12/2011 | Faenger | H04M 1/7253 |
| | | | 701/431 |
| 2013/0334298 A1* | 12/2013 | Sakpal | G06F 16/9554 |
| | | | 235/375 |
| 2013/0346300 A1* | 12/2013 | Kang | H04L 12/2827 |
| | | | 705/39 |
| 2014/0184830 A1 | 7/2014 | Eom | |
| 2014/0206287 A1 | 7/2014 | Chang et al. | |
| 2014/0220897 A1* | 8/2014 | Wan | H04W 12/003 |
| | | | 455/41.2 |
| 2016/0149905 A1* | 5/2016 | Wang | H04L 12/06 |
| | | | 455/41.2 |
| 2016/0226870 A1* | 8/2016 | Chiu | H04L 63/0492 |
| 2016/0249216 A1* | 8/2016 | Glazer | G06K 9/6202 |
| 2016/0260319 A1 | 9/2016 | Jeffery et al. | |
| 2017/0134553 A1* | 5/2017 | Jeon | G06F 3/04886 |
| 2017/0169688 A1* | 6/2017 | Britt | G08B 21/0453 |
| 2018/0054487 A1* | 2/2018 | Hebsur | G06F 1/1686 |
| 2018/0060661 A1 | 3/2018 | Sato et al. | |
| 2018/0114336 A1* | 4/2018 | Chang | G01S 19/13 |
| 2018/0145729 A1* | 5/2018 | Takagi | H04N 5/23206 |
| 2018/0189970 A1* | 7/2018 | Balasubramanian | |
| | | | G06F 3/04842 |
| 2018/0341917 A1* | 11/2018 | Atwal | G06Q 30/0222 |
| 2019/0027147 A1* | 1/2019 | Diamant | G06F 3/167 |
| 2019/0080168 A1* | 3/2019 | Nowak-Przygodzki | |
| | | | G06K 9/00671 |

FOREIGN PATENT DOCUMENTS

| | | |
|---|---|---|
| JP | 2017-59959 A | 3/2017 |
| JP | 2017-102783 A | 6/2017 |
| KR | 10-2011-0117906 A | 10/2011 |
| KR | 10-2015-0014663 A | 2/2015 |
| WO | 2013043534 A1 | 3/2013 |
| WO | 2015089913 A1 | 6/2015 |
| WO | 2017018683 A1 | 2/2017 |
| WO | 2017119735 A1 | 7/2017 |

OTHER PUBLICATIONS

V. Govindraj, M. Sathiyanarayanan and B. Abubakar, "Customary homes to smart homes using Internet of Things (IoT) and mobile application," 2017 International Conference on Smart Technologies For Smart Nation (SmartTechCon), 2017, pp. 1059-1063. (Year: 2017).*

Guo, Hengyuan, et al. "Bluetooth door lock system based on smart mobile device." Proceedings of the 2nd International Conference on Computer Science and Application Engineering. 2018, pp. 1-5. (Year: 2018).*

Communication dated Jul. 5, 2019, issued by the European Patent Office in counterpart European Application No. 18 210 682.3.

Communication dated Nov. 22, 2019 by the European Patent Office in counterpart European Patent Application No. 18210682.3.

Communication dated Feb. 14, 2019, issued by the European Patent Office in counterpart European Application No. 18210682.3.

International Search Report (PCT/ISA/210) dated Mar. 5, 2019 issued by the International Searching Authority in International Application No. PCT/KR2018/015275.

Written Opinion (PCT/ISA/237) dated Mar. 5, 2019 issued by the International Searching Authority in International Application No. PCT/KR2018/015275.

Communication dated Apr. 6, 2020, issued by the European Patent Office in counterpart European Application No. 18 210 682.3.

Communication dated Aug. 24, 2021, issued by the Korean Patent Office in counterpart Korean Patent Application No. 10-2017-0166928.

* cited by examiner

FIG. 1
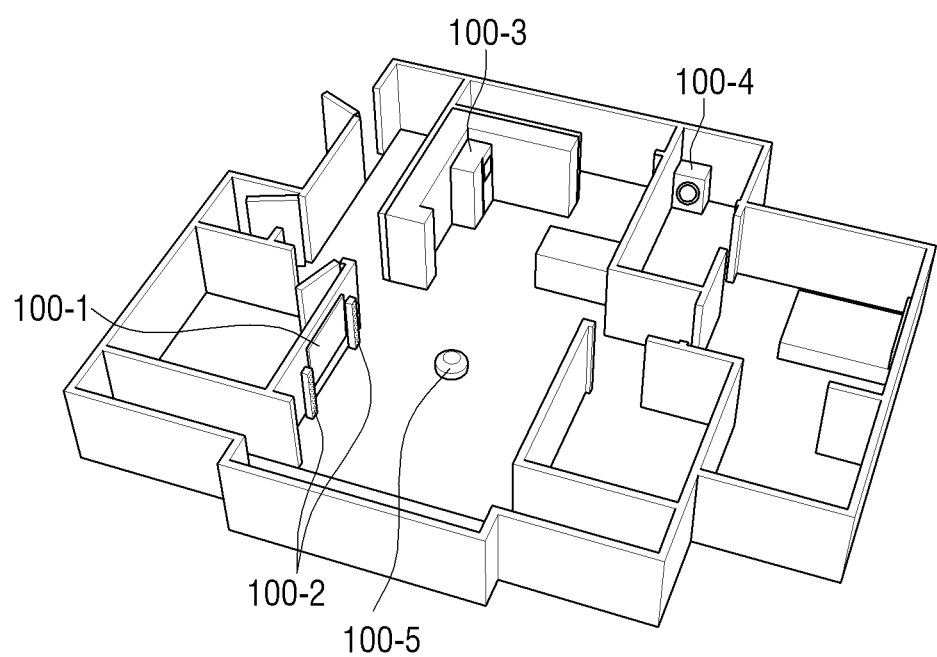
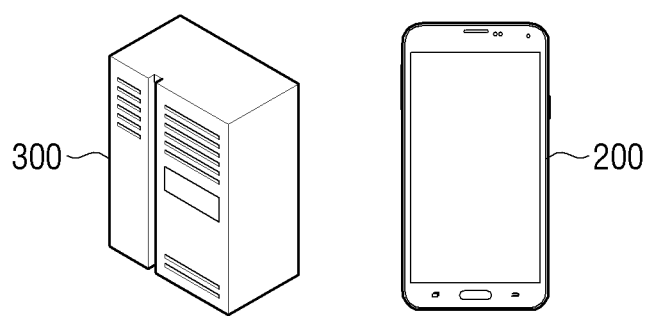

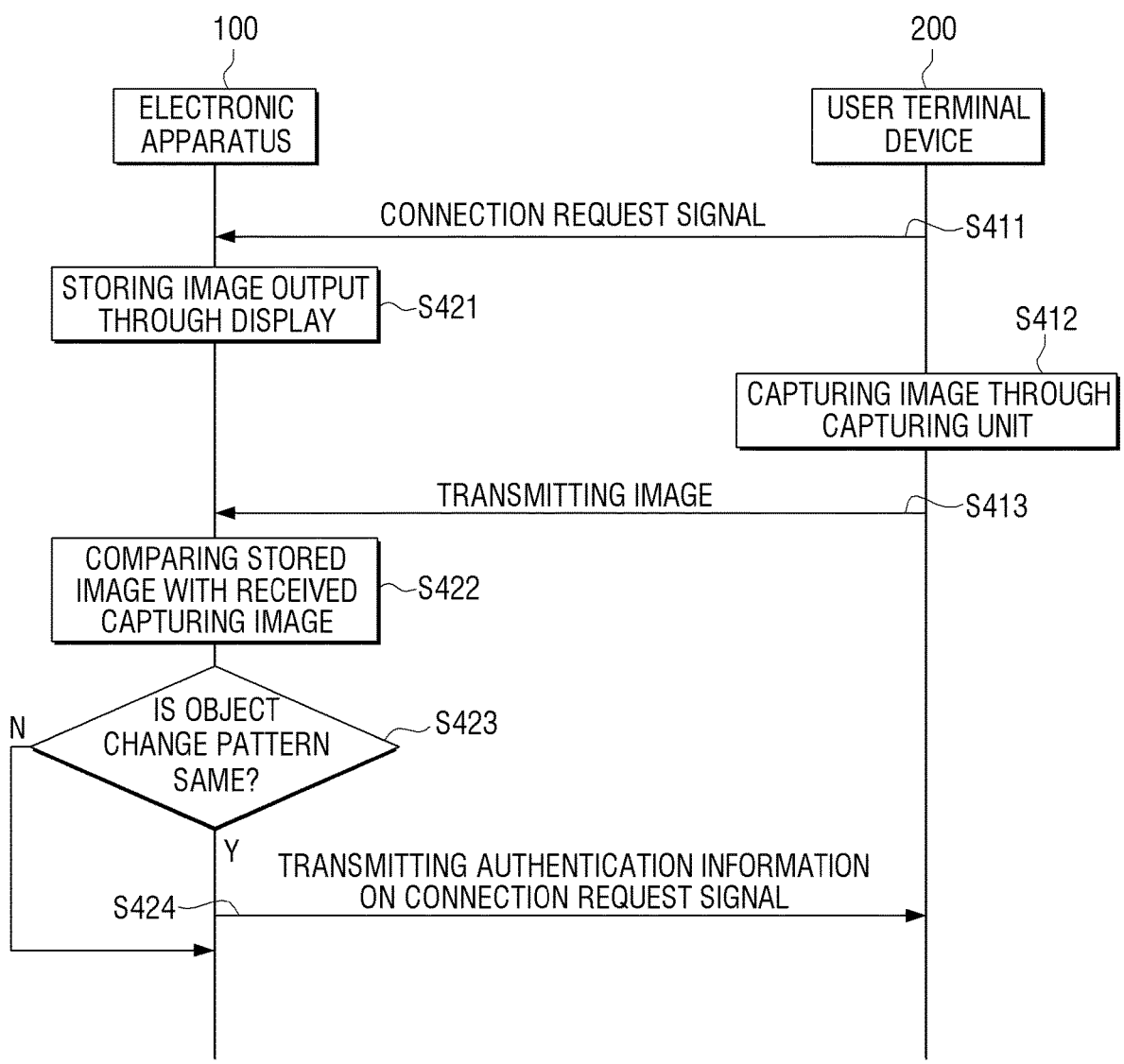

FIG. 8
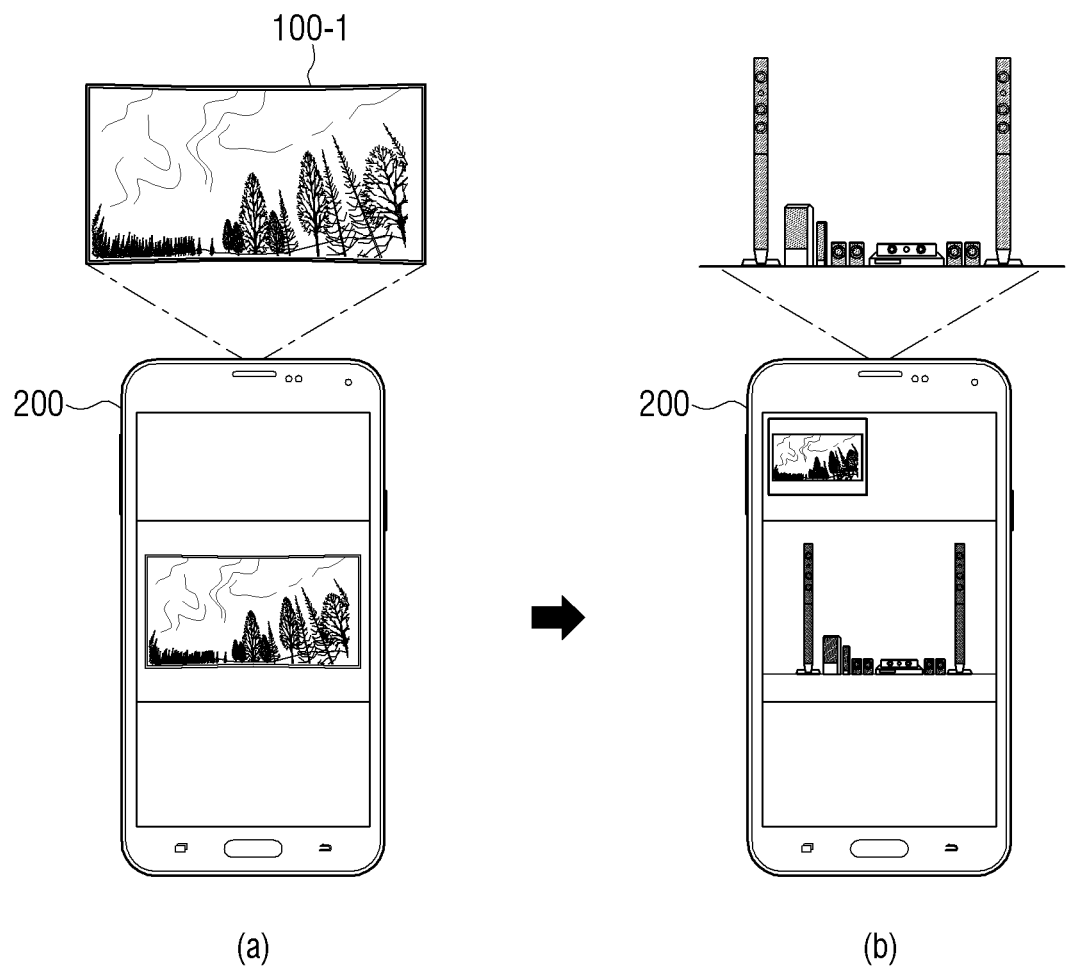
(a)  (b)
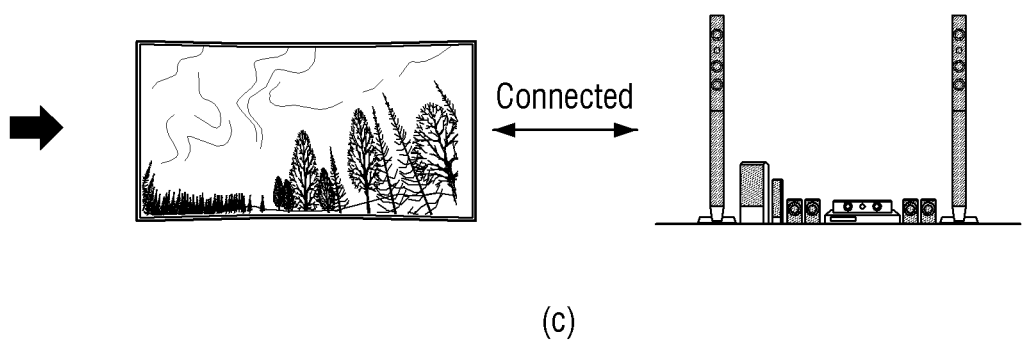
(c)

FIG. 9
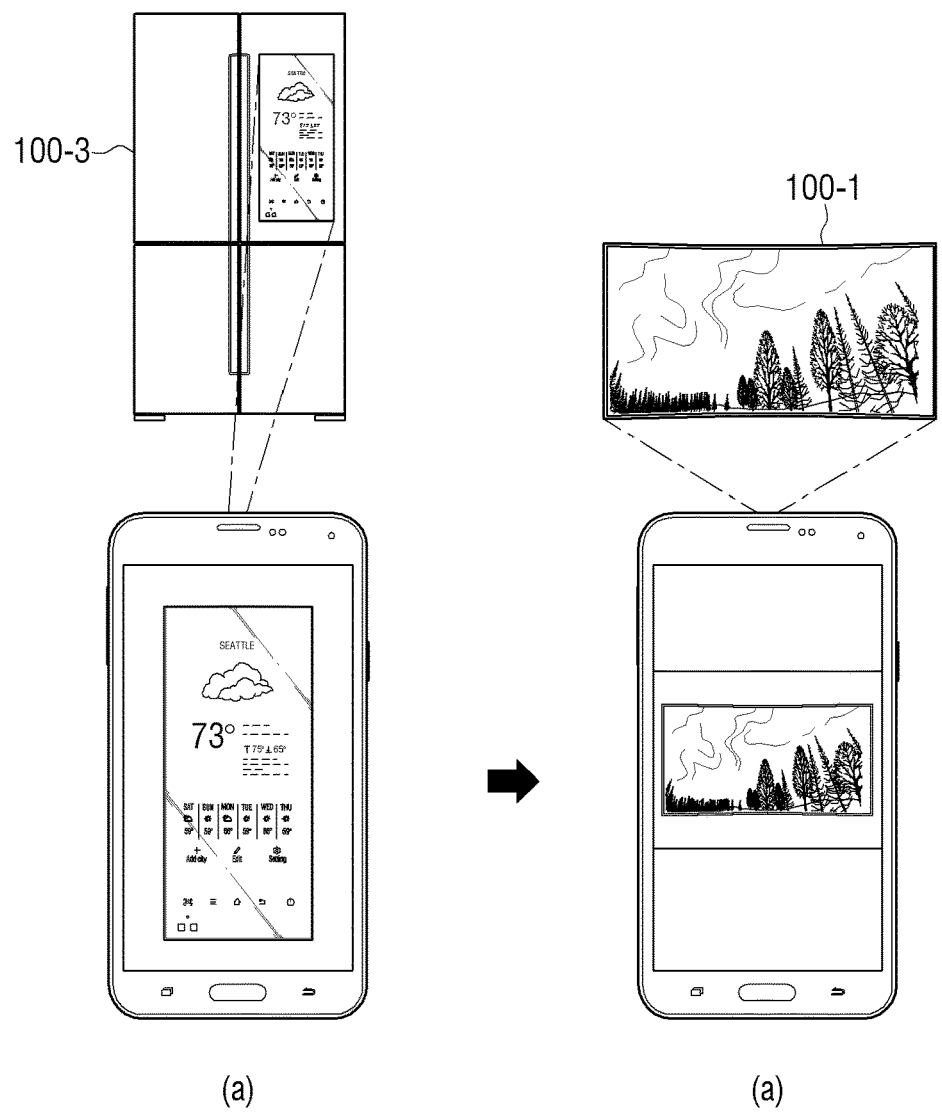
(a)  (a)
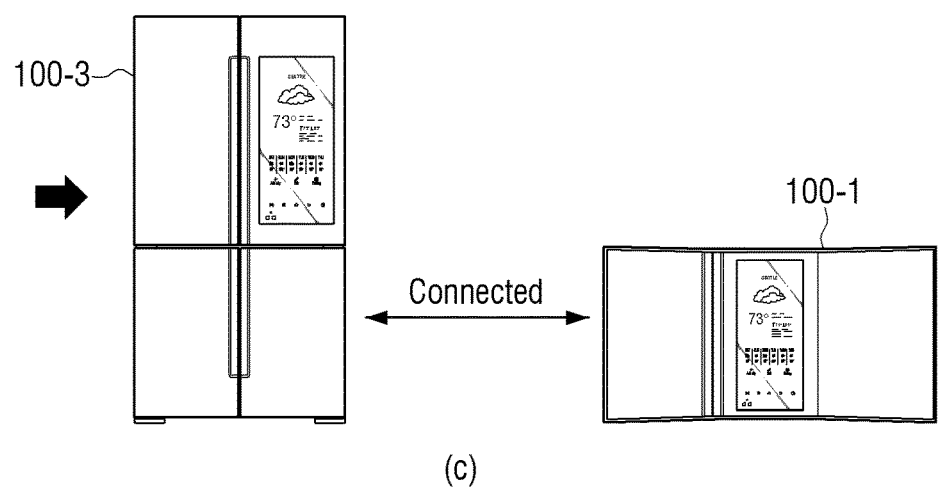
(c)

FIG. 10
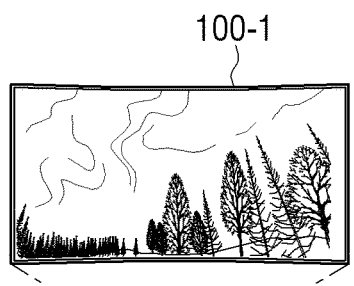
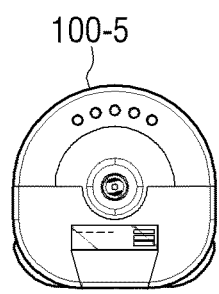
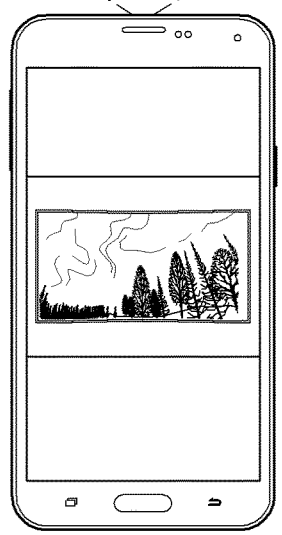
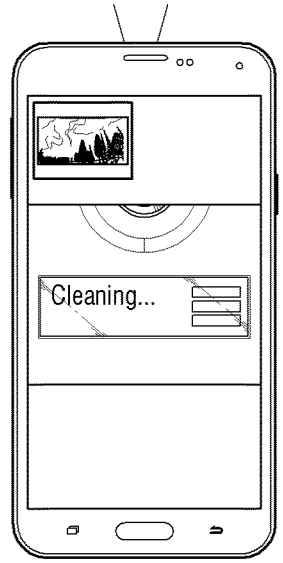
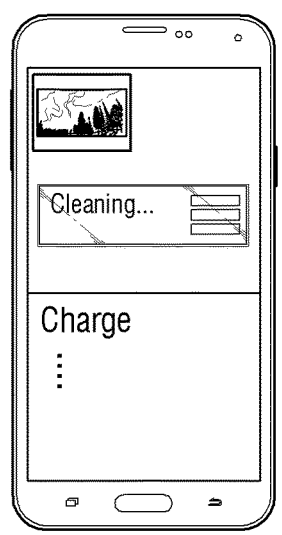
(a)　　　　　　　　(b)　　　　　　　　(c)
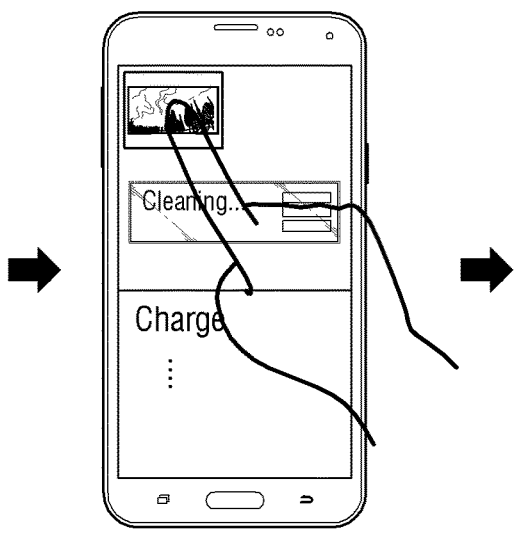
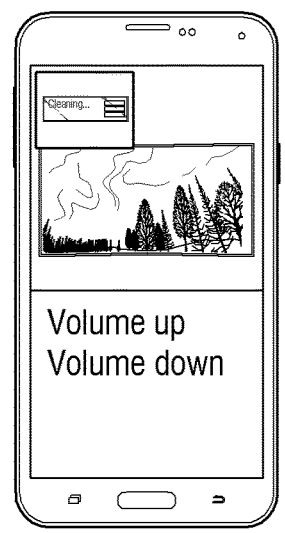
(d)　　　　　　　　(e)

ELECTRONIC DEVICE, USER TERMINAL APPARATUS, AND CONTROL METHOD THEREOF

CROSS-REFERENCE TO RELATED APPLICATIONS

This application is based on and claims priority under 35 U.S.C. § 119 to Korean Patent Application No. 10-2017-0166928, filed on Dec. 6, 2017, in the Korean Intellectual Property Office, the disclosure of which is incorporated herein by reference in its entirety.

BACKGROUND

1. Field

The disclosure relates to an electronic apparatus, a user terminal device and a method for controlling thereof, and more particularly, to an electronic apparatus for performing connection between an electronic apparatus and a user terminal device, a user terminal device, and a method for controlling thereof.

2. Description of the Related Art

With the recent development of electronic technology, various electronic apparatuses provided at home, work or other areas have a communication function for connecting with each other via a network.

A plurality of electronic apparatuses can be easily controlled by one terminal device by connecting an electronic apparatus via a network, and status information of the electronic apparatus can be checked.

However, in order to connect electronic apparatuses to a network and identify the electronic apparatuses through a terminal device, an initial connection setting procedure between each electronic apparatus and the terminal device is necessary, and such setting requires a number of operations to be performed by the user.

In addition, there is a problem that a user has to go through authentication processes when a terminal device is disconnected from an existing electronic apparatus and connected to a new electronic apparatus even after performing the initial connection setting procedure.

Accordingly, a method for easily identifying an electronic apparatus through a terminal device and skipping authentication processes during initial connection or reconnection is in high demand.

SUMMARY

According to an aspect of the disclosure, there is provided an electronic apparatus, comprising: a communicator; a storage; a display; and a processor configured to: based on a connection request signal being received from a user terminal device through the communicator, control to store in the storage a first image output through the display, based on a second image being received from the user terminal device through the communicator, identify a first object included in the stored first image that is same as second object included in the received second image, and based on a identification that a first feature of the first object is same as a second feature of the second object, control the communicator to transmit authentication information corresponding to the connection request signal to the user terminal device.

The processor may be further configured to receive the connection request signal transmitted through a network device to which the communicator is connected, and control the communicator to perform peer-to-peer (P2P) communication with the user terminal device according to authenticated communication connection request from the user terminal device based on the authentication information.

The first object may be at least one of text information and RGB information included in the first image and the second object may be at least one of text information and RGB information included in the second image.

The processor may be further configured to perform communication with another electronic apparatus based on authentication information of the another electronic apparatus received from the user terminal device.

The processor may be further configured to: control the communicator to transmit, to the another electronic apparatus, a request information about a function of the another electronic apparatus, based on the information about the function being received, identify a function operable in association with the another electronic apparatus according to a function of the electronic apparatus and the information about the function of the another electronic apparatus, and perform the identified function.

The processor may be further configured to, based on a identification that the function of the electronic apparatus includes a display function and the function of the another electronic apparatus includes a display function, identify that a mirroring function with the another electronic apparatus is possible, receive an image displayed on the another electronic apparatus, and perform the mirroring function.

The processor may be further configured to identify a first pattern of change of the first object as the first feature and a second pattern of change of the second object as the second feature, based on the identification that the first pattern is same as the second pattern, control the communicator to transmit the authentication information to the user terminal device.

According to another aspect of the disclosure, there is provided user terminal device, comprising: an input unit; a capturing unit; a communicator; and a processor configured to: transmit a connection request signal to an electronic apparatus through the input unit according to a user command, transmit an image captured by the capturing unit to the electronic apparatus corresponding to the connection request signal, receive authentication information based on the image transmitted to the electronic apparatus, and based on the authentication information on the connection request signal being received from the electronic apparatus, perform peer-to-peer (P2P) communication with the electronic apparatus based on the authentication information.

The processor may be further configured to control the communicator to broadcast the connection request signal to the electronic apparatus through a network device to which the communicator is connected, and control the communicator which broadcasts the captured image to the electronic apparatus through the network device after a predetermined time has elapsed.

The processor may be further configured to control the capturing unit to perform capturing for a period of time after transmitting the connection request signal.

The processor may be further configured to control the capturing unit to start capturing the image according to a capturing command of a user, and control the communicator to transmit the image captured by the capturing unit to the electronic apparatus after transmitting the connection request signal.

The user terminal device may further comprise: a display; and a storage configured to store connection information on another connected electronic apparatus, wherein the processor may be further configured to, based on entering a mode for performing connection with an external electronic apparatus, control the display to display an image of the another connected electronic apparatus on the display based on information stored in the storage.

The processor may be further configured to control the communicator to transmit the connection information on the another electronic apparatus to the electronic apparatus according to a predetermined command, and wherein the connection information may include authentication information for the electronic apparatus to perform P2P communication with the another electronic apparatus.

The connection information may include authentication information for the electronic apparatus to perform P2P communication with the another electronic apparatus and information about a function of the another electronic apparatus, and wherein the processor may be further configured to: request information about a function of the electronic apparatus to the electronic apparatus, identify a function operable between the electronic apparatus and the another electronic apparatus based on the information about the function of the electronic apparatus and the information about the function of the another electronic apparatus, and provide the identified function to the display.

The image captured by the capturing unit may be an image of the display provided in the electronic apparatus.

According to another aspect of the disclosure, there is provided a controlling method for a user terminal device, the method comprising: transmitting a connection request signal to an electronic apparatus according to a user command; transmitting an image captured by a capturing unit of the user terminal device to the electronic apparatus corresponding to the connection request signal; receiving authentication information based on the image transmitted to the electronic apparatus, and based on the authentication information on the connection request signal being received from the electronic apparatus, performing peer-to-peer (P2P) communication with the electronic apparatus based on the authentication information.

The transmitting of the connection request signal to the electronic apparatus may comprise broadcasting the connection request signal to the electronic apparatus through a network device to which the user terminal device is connected, and wherein the transmitting of the captured image to the electronic apparatus may comprise broadcasting the captured image to the electronic apparatus through the network device after a predetermined time has elapsed.

The transmitting of the captured image to the electronic apparatus may comprise starting capturing according to a capturing command of a user, and transmitting the image captured by the capturing unit to the electronic apparatus after transmitting the connection request signal.

The user terminal device may include connection information on another connected electronic apparatus, and wherein the method further may comprise, based on entering a mode for performing connection with an external electronic apparatus, displaying an image of the another electronic apparatus based on connection information on the another electronic apparatus.

The method may further comprise: transmitting the connection information on the another electronic apparatus to the electronic apparatus according a predetermined command, wherein the connection information may include authentication information for the electronic apparatus to perform P2P communication with the another electronic apparatus.

The connection information may include authentication information for the electronic apparatus to perform P2P communication with the another electronic apparatus and information about a function of the another electronic apparatus, and wherein the method may further comprise: requesting information about a function of the electronic apparatus to the electronic apparatus; identifying a function operable between the electronic apparatus and the another electronic apparatus based on the information about the function of the electronic apparatus and the information about the function information of the another electronic apparatus; and displaying the identified function.

According to another aspect of the disclosure, there is provided an electronic apparatus, comprising: a communicator; a storage; a display; and a processor configured to: receive a connection request signal from a user terminal device through the communicator, control to store a first image output through the display in the storage corresponding to the connection request signal, receive a second image from the user terminal device through the communicator, identify a first region and a second region in the first image and a third region and a fourth region in the second image, which are respectively corresponding to each other, determine whether a first feature in the first region is identical to a third features in the third region and a second feature in the second region is identical to a fourth features in the fourth region, and control the communicator to transmit authentication information to the user terminal device based on the determination that first feature and the third feature are identical and the second feature and the fourth feature are identical.

The first, the second, the third and the fourth features may be dynamic features, which are changeable according to the operation of the electronic apparatus.

According to another aspect of the disclosure, there is provided an electronic apparatus, comprising: a communicator; a storage; a display; and a processor configured to: receive a connection request signal from a user terminal device through the communicator, control to store a plurality of first images output through the display in the storage corresponding to the connection request signal, receive a plurality of second images from the user terminal device through the communicator, identify a first region in each of the plurality of first images and a second region in each of the plurality of second images, which are respectively corresponding to each other, determine whether a pattern of change between the first regions of the plurality of first images is identical to a pattern of change between the second regions of the plurality of second images, and control the communicator to transmit authentication information to the user terminal device based on a results of the determination.

The plurality of first images and second images may be in a sequence.

BRIEF DESCRIPTION OF THE DRAWINGS

FIG. 1 is a view illustrating an example of a home network system according to an embodiment of the disclosure;

FIG. 4 is a sequence diagram to explain a controlling method for an electronic apparatus and a user terminal device according to an embodiment of the disclosure;

FIGS. 8 and 9 are views to explain a method for communication connection between electronic apparatuses according to an embodiment of the disclosure;

FIG. 10 is a view to explain a controlling method for an electronic apparatus according to an embodiment of the disclosure;

DETAILED DESCRIPTION OF EXEMPLARY EMBODIMENTS

Figure 2:
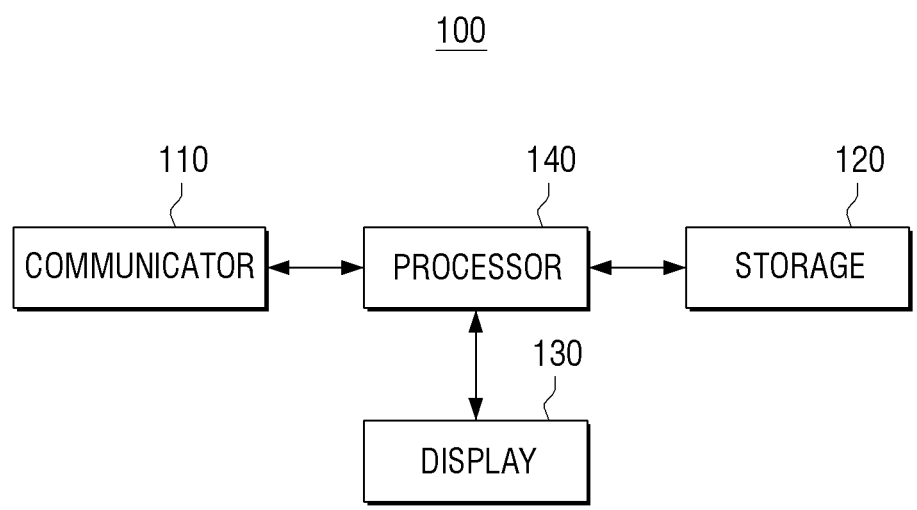
FIG. 2 is a block diagram illustrating configuration of an electronic apparatus according to an embodiment of the disclosure.

The terms used in this specification will be briefly described, and the disclosure will be described in detail.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

The disclosure is not limited to an embodiment disclosed below and may be implemented in various forms and the scope of the disclosure is not limited to the following embodiments. In addition, all changes or modifications derived from the meaning and scope of the claims and their equivalents should be construed as being included within the scope of the disclosure. In the following description, the configuration which is publicly known but irrelevant to the gist of the disclosure could be omitted.

The terms such as "first," "second," and so on may be used to describe a variety of elements, but the elements should not be limited by these terms. The terms are used simply to distinguish one element from other elements.

The singular expression also includes the plural meaning as long as it does not differently mean in the context. In this specification, terms such as 'include' and 'have/has' should be construed as designating that there are such characteristics, numbers, operations, elements, components or a combination thereof in the specification, not to exclude the existence or possibility of adding one or more of other characteristics, numbers, operations, elements, components or a combination thereof.

In an exemplary embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

Hereinafter, embodiments of the disclosure will be described in detail with reference to the accompanying drawings so that those skilled in the art can easily carry out the disclosure. However, the disclosure may be embodied in many different forms and is not limited to the embodiments described herein. In order to clearly illustrate the disclosure in the drawings, some of the elements that are not essential to the complete understanding of the disclosure are omitted for clarity, and like reference numerals refer to like elements throughout the specification.

FIG. 1 is a view illustrating of a home network system according to an embodiment of the disclosure. Referring to FIG. 1, a home network system may include at least one electronic apparatus 100 and a user terminal device 200.

The electronic apparatus 100 may be embodied as various types of home appliances such as a display apparatus 100-1, a speaker 100-2, a refrigerator 100-3, an electric washing machine 100-2, a robot vacuum cleaner 100-5, an air conditioner, an air purifier, a set-top box, etc. However, the disclosure is not limited thereto, and the electronic apparatus 100 may be embodied as various types of electronic apparatuses such as various medical devices, internet of things, sensors, or the like.

The electronic apparatus 100 may perform communication with an external device 300. Examples of the external device 300 may include a network device, another electronic apparatus, a server, the user terminal device 200, or the like. The network device may be embodied as various types of devices that serves as a bridge such as AP (Access Point). For example, the network device may be embodied as a router, a switch, an IP router, and a wireless network card.

The electronic apparatus 100 may receive signals, data, etc. transmitted from the user terminal device 200, and perform peer-to-peer (P2P) communication with a user terminal device based on the received signals and data. Examples of the user terminal device 200 may include a smart phone, a tablet, a portable terminal device, a smart watch, a wearable device, etc. However, the disclosure is not limited thereto, but the user terminal device 200 could be any type of device as long as it includes a camera and can transmit an image captured by the camera to an external device.

The user terminal device 200 may perform communication with an external device. As described above, Examples of the external device may include the network device, the electronic apparatus 100, the server, etc.

The user terminal device 200 may transmit a connection request signal and an image to the electronic apparatus 100. According to an embodiment, the connection request signal may be a predetermined connection request signal. For example, the user terminal device 200 may transmit the image after transmitting the connection request signal to the electronic apparatus 100. The electronic apparatus 100 may transmit authentication information on the connection request signal to the user terminal device 200 based on the signal and the image received from the user terminal device 200. For example, the user terminal device 200 may identify the electronic apparatus 100 through a camera provided in the user terminal device 200, and transmit a connection request signal and an image to the identified electronic apparatus 100. In this case, the electronic apparatus 100 that receives the image may identify whether to transmit authentication information to the user terminal device 200 based on the received image. The user terminal device 200 may identify the electronic apparatus 100 by using a method for identifying an external device based on augmented reality (AR), and transmit a signal, an image, or the like to the identified electronic apparatus 100. The description thereof will be detailed below.

For another example, the user terminal device 200 may transmit a signal, an image, etc. to an electronic apparatus connected to a network device through the network device. For example, the user terminal device 200 may transmit a connection request signal and an image to a plurality of electronic devices 100-1 to 100-5 via the network device 300. For example, the connection request signal and the image may be broadcasted via the network device, and the plurality of electronic apparatuses 100-1 to 100-5 connected to the network device may receive the connection request signal and the image. Broadcasting refers to transmitting data using a 1:N connection or a 1:All connection, that is, refers to a method for transmitting data without specifying Mac Address of an electronic device that receives data. For example, when the user terminal device 200 broadcasts an image, the plurality of electronic apparatuses 100-1 to 100-5 connected to AP may receive an image. The electronic apparatus 100 may transmit authentication information on the connection request signal to the user terminal device 200 based on the received signal and image. The user terminal device 200 may request communication connection to the electronic apparatus 100 based on the authentication information, and the electronic apparatus 100 and the user terminal device 200 may perform peer-to-peer (P2P) communication. Various type of P2P communication where the electronic apparatus 10 and the user terminal device 200 are directly connected may refer to Bluetooth communication, WiFi P2P (Wi-Fi Peer-to-Peer), Wi-Fi Direct, or the like. The operations of the electronic apparatus 10 and the user terminal device 200 have been briefly described. Hereinafter, controlling methods for the electronic apparatus and the user terminal device 200 according to various embodiments of the disclosure will be described in detail.

FIG. 2 is a block diagram illustrating configuration of an electronic apparatus according to an embodiment of the disclosure.

Referring to FIG. 2, an electronic apparatus 100 may include a communicator 110, a storage 120, a display 130 and a processor 140.

The communicator 110 may communicate with an external device. According to an embodiment of the disclosure, the communicator 110 may perform communication with the external device through various communication methods such as Bluetooth (BT), Wireless Fidelity (WI-FI), Zigbee, Infrared (IR), Serial Interface, Universal Serial Bus (USB), Near Field Communication (NFC), etc.

The communicator 110 may receive a connection request and an image from the user terminal device 200. For example, the communicator 110 may receive a connection request signal and an image which are broadcasted by the user terminal device 200 connected to the same AP through the AP. However, the present disclosure is not limited thereto. The connection request signal and the image may not be via the AP, but may be directly transmitted to the electronic apparatus 100 by the user terminal device 200. The connection request signal may be a signal that requests authentication information of the electronic apparatus 100 for performing peer-to-peer (P2P) connection with the electronic apparatus 100.

The image received from the user terminal device 200 may be an image of a display 130 provided in the electronic apparatus 100 by the user terminal device 200. The detailed description thereof will be made below.

The storage 120 may store various data such as an Operating System (O/S) software module for driving the electronic apparatus 100, various communication module, connection information on another electronic apparatus that has been already connected, an image analysis software module, various content, etc.

The storage 120 may be embodied as an internal memory such as ROM, RAM, etc. included in the processor 140, or embodied as a memory separated from the processor 140. The storage 120 may be embodied as a memory embedded in the electronic apparatus 100 according to data storage purpose, or embodied as a memory that can be detachably attached to the electronic apparatus 100. For example, data for driving the electronic apparatus 100 may be stored in a memory embedded in the electronic apparatus 100, and data for an expansion function of the electronic apparatus 100 may be stored in a memory that can be detachably attached to the electronic apparatus 100. A memory embedded in the electronic device 100 may be implemented as a nonvolatile memory, a volatile memory, a hard disk drive (HDD), or a solid state drive (SSD), and a memory that can be detachably attached to the sound output apparatus 100 may be implemented as a memory card (e.g., a micro SD card, a USB memory, etc.), an external memory that can be connected to a USB port (e.g., a USB memory), and the like.

The display 130 may display various types of images and may be embodied with a liquid crystal display (LCD), an organic light emitting diode (OLED) or a plasma display panel (PDP) or the like. However, the present disclosure is not limited thereto. The type of display 130 could vary. For example, the display 130 may be embodied as a seven-segment display.

The processor 140 may control the overall operation of the electronic apparatus 100.

According to an embodiment, the processor 120 may include one or more of a central processing unit (CPU), a microcontroller unit (MCU), a micro processing unit (MPU), a controller, an application processor (AP), a communication processor (CP), an ARM processor, or the like, or may be defined by the term. The processor 140 may be implemented as a system on chip (SoC) where a processing algorithm is embedded, a large scale integration (LSI), or the like or may be embodied in the form of a Field Programmable Gate Array (FPGA).

The processor 140 may store a first image output from the display 130 in the storage 120 based on a connection request signal being received from the user terminal device 200 through the communicator 110. For example, the processor 140 may control the communicator 110 to be connected to an AP according to a WiFi communication standard connectable in an area where the electronic apparatus 100 is positioned. Based on the connection request signal being received through the communicator 110 via the connected AP, the processor 140 may store the first image output through the display 130 in the storage 120. The connection request signal may not be via the AP, but could be directly received from the user terminal device 200.

The first image stored in the storage 120 may be an image currently being output through the display 130. For example, the processor 140 may output multimedia contents, status information of the electronic apparatus 100, information according to the operation of the electronic apparatus 100, an image, etc. through the display 130. Based on the connection request signal being received, the processor 140 may start recording the first image that is currently output, and the recorded image may be stored in the storage 120.

Based on a second image being received through the communicator 110, the processor 140 may compare the first image stored in the storage 120 with the received second image. The second image may be an image transmitted from the user terminal device 200.

The processor 140 may identify an object in the received second image same as an object included in the stored first image. The object may refer to images respectively included in the first and second images, text information, figures, RGB information of each of the first and second images, etc. For example, it can be identified whether the same text as text included in the first image is included in the second image. According to another example, it can be identified whether a figure in the same shape as a specific figure included in the first image is included in the second image.

According to an embodiment, the first image stored in the electronic apparatus 100 and the second image received through the communicator 110 may be a still image.

Based on the same object as the object included in the first image being identified in the second image, the processor 140 may determine whether a feature of the object included in the first image is the same as a feature of the identified object in the second image. According to an embodiment, the features of the object may be a dynamic feature, which may change according to the operation of the respective electronic apparatus. For example, it can be identified whether a feature of first text information included in the first image is the same as a feature of second text information included in the second image.

According to another embodiment, the processor 140 may identify a plurality of objects in the second image same as a plurality of objects included in the stored first image. The plurality of objects may refer to images respectively included in the first and second images, text information, figures, RGB information of each of the first and second images, etc. For each of the plurality of same objects identified in the first image and the second image, the processor 140 may determine whether a feature of each of the plurality of objects included in the first image is the same a feature of the corresponding object, among the plurality objects, in the second image. According to an embodiment, the features of the plurality of objects may be a dynamic feature, which may change according to the operation of the respective electronic apparatus.

According to yet another embodiment, each of the first image stored in the electronic apparatus 100 and the second image received through the communicator 110 may include multiple images. For example, the first image may include multiple first images in a sequence and the second image may include multiple second images in a sequence.

According to an embodiment, in which the first image and the second image respectively include multiple images, the processor 140 may identify a pattern of change between feature 'the remaining washing time 01:30' in a first first image, among the first multiple images, and 'the remaining washing time 01:29' in a second first image, among the first multiple images, identify a pattern of change between feature 'the remaining washing time 01:30' in a first second image, among the second multiple images, and 'the remaining washing time 01:29' in a second second image, among the second multiple images, and determine whether the pattern of change is same in the multiple first images and the multiple second images feature. Specific examples thereof will be described with reference to FIGS. 5 and 6.

The processor 140 may control the communicator 110 to transmit the authentication information on the predetermined connection request signal to the user terminal device 200 based on the identification result. For example, the processor 140, based on the feature of the first image being the same as the feature of the second image, may determine that the second image received from the user terminal device 200 is an image of the display 130 provided in the electronic apparatus 100 that is outputting the first image. The processor 140 may control the communicator 110 to transmit the authentication information to the user terminal device 200.

The authentication information may include information for performing P2P communication with the electronic apparatus 100. The user terminal device 200 may request P2P communication connection to the electronic apparatus 100 based on the authentication information. The detailed description thereof will be made in the detailed view of the user terminal device 200.

As described above, the communicator 110 has been limited to one constituent element, but depending on an embodiment, the plurality of communicators 110 may include a plurality of communication modules. For example, a first communicator may be embodied as a WiFi module, and a second communicator may be embodied as a Bluetooth module. In this case, communication with a network device may be performed through the first communicator, and communication with the user terminal device 200 may be performed through the second communicator.

The processor 140 may compare the first image with the second image and identify whether the same image frame is included therein. For example, the first and second images may have different reproduction times, and the processor 140 may identify whether a feature of an object identified in a specific section of the first image is the same as a feature of an object identified in a specific section of the second image. Accordingly, it should be understood that only a specific reproduction section may be considered, not a whole reproduction section of each of the first image and the second image to identify features of objects in the first and second images and determine whether the features are the same.

The processor 140, based on authentication information on another electronic apparatus being received from the user terminal device 200, may control the communicator 110 to perform communication with another electronic apparatus based on the received authentication information. For example, when the display device 100-1 is connected to the user terminal device 200, and receives authentication information on the second speaker 100-2 from the user terminal device 200, the display apparatus may perform the P2P communication with the speaker based on the received authentication information.

The processor 140 may request function information of another electronic apparatus to the connected another electronic apparatus. The processor 140 may identify a function operable in association with another electronic apparatus based on function information of the electronic apparatus 100 and another electronic apparatus, and perform the identified function. For example, when the electronic apparatus 100 includes a display function, and the function information of another other electronic apparatus has a display function, it is identified that a mirroring function may be perform with another electronic apparatus, and an image displayed on another electronic apparatus may be received to perform a mirroring function. However, the disclosure is not limited thereto. For another example, the speaker 100-2 may identify a function operable in association with the display apparatus 100-1, and when it is identified that a sound output function can be mirrored by the display apparatus 100-1, the speaker 100-2 may receive a sound signal of a content output from the display apparatus 100-1 from the display apparatus 100-1 and output the sound signal.

Figure 3A:
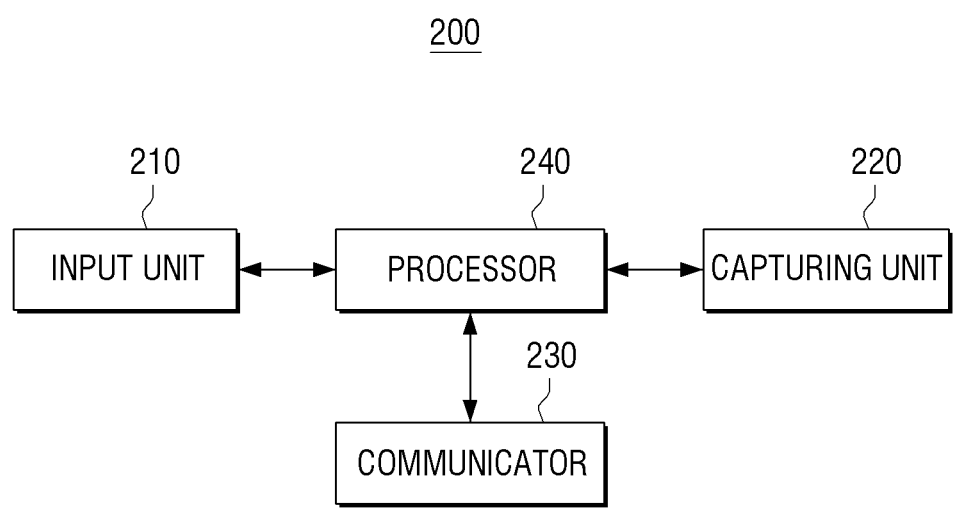
FIG. 3A is a block diagram illustrating configuration of a user terminal device according to an embodiment of the disclosure.

FIG. 3A is a block diagram illustrating configuration of a user terminal device according to an embodiment of the disclosure.

Referring to FIG. 3A, a user terminal device 200 may include an input unit 210, a capturing unit 220, a communicator 230 and a processor 240.

The input unit 210 may receive various user commands for controlling the user terminal device 200. The input device 210 may be embodied as an input panel. The input panel may be embodied as a touch pad capable of touch input or a key pad including various function keys, numeric keys, character keys, etc. However, the disclosure is not limited thereto, but the input device 210 may be embodied as various input devices such as a voice input device, a motion input device, etc.

The capturing unit 220 may obtain an image by capturing a peripheral area of the user terminal device 200. The capturing unit 220 may include a camera, a video camera, etc. The capturing unit 220 is not limited to one constituent element included in the user terminal device 200, but could be embodied as an external device connected to an external terminal of the user terminal device 200.

The capturing unit 220 may capture the electronic apparatus 100 in the vicinity of the user terminal device 200. For example, the capturing unit 220 may obtain an image by capturing the display 130 provided in the electronic apparatus 100.

The communicator 230 may be configured to perform communication with an external device. For example, the communicator 230 may perform communication with an external device using various communication methods such as BT (BlueTooth), BLE (Bluetooth Low Energy), Wi-Fi (Wireless Fidelity), Zigbee, etc. The external device may be embodied as the network device, the electronic device 100, and the server.

The processor 240 may control the overall operation of the user terminal device 200.

The processor 240 may control the communicator 230 to transmit a connection request signal to the electronic apparatus 100 according to a user command through the input unit 210. According to an embodiment, the connection request signal may be a predetermined connection request signal. For example, the processor 240 may control the communicator 230 to be connected to a network device according to the WiFi communication standard connectable in the area where the user terminal device 200 is disposed, and broadcast the connection request signal through the network device. The plurality of electronic apparatuses 100-1 to 100-5 connected to the same network device may receive the connection request signal.

The connection request signal may refer to an authentication information request signal of the electronic apparatus 100 for performing the P2P communication between the user terminal device 200 and the electronic apparatus 100.

However, the disclosure is not limited thereto, and the processor 240 may directly transmit the connection request signal to a specific electronic apparatus 100. For example, the processor 240 may identify the specific electronic apparatus 100 by using a method of identifying an external device based on augmented reality, and transmit the connection request signal to the identified electronic apparatus 100. According to the method for identifying the external device based on the augmented reality, when a marker is attached to the electronic apparatus 100, the specific electronic apparatus 100 may be identified based on the marker, and the connection request signal may be transmitted to the identified electronic apparatus. However, the disclosure is not limited thereto, as the processor 240 may identify the specific electronic apparatus 100 using other methods for identifying an external device.

For another example, the processor 240 may identify the specific electronic apparatus 100 from the image captured by the capturing unit 220, and transmit the connection request signal to the identified electronic apparatus 100.

According to another embodiment, the processor 240 may transmit the connection request signal to the specific electronic apparatus 100 based on near field communication method. The processor 240 may transmit the connection request signal to either an electronic apparatus selected by a user command or a specific electronic apparatus according to a predetermined priority, among a plurality of electronic apparatuses connected to the same network device.

The processor 240, after transmitting the connection request signal, may control the capturing unit 220 to capture a peripheral area of the user terminal device 200. For example, the capturing unit 220 may obtain an image by capturing the display 130 provided in the electronic apparatus 100 corresponding to a user operation.

The processor 240 may transmit an image to the electronic apparatus 100 through the communicator 230 after a period of time. For example, an image may be broadcasted through the network device to which the user terminal device 100 is connected and transmitted to the plurality of electronic apparatuses 100-1 to 100-5. According to another embodiment, the processor 240 may transmit an image to the electronic apparatus 100 based on the method for identifying the external device based on the augmented reality and the near field communication method.

According to an embodiment, the processor 240 may control the capturing unit 220 to perform capturing for a period of time, and transmit the connection request signal to the electronic apparatus 100. The period of time may be a predetermined period of time. In other words, the order of starting capturing an image through the capturing unit 220 and transmitting a connection request signal through the communicator 230 is not fixed and depending on various embodiments, the order can be reversed. According to another embodiment the processor 240 may transmit the connection request signal, while the capturing unit 220 performs capturing for the predetermined time. According to yet another embodiment the processor 240 may transmit the connection request signal together with the image captured by the capturing unit 220.

According to another embodiment, the processor 240, based on a capturing command of a user being input through the input unit 210, may control the capturing unit 220 to perform capturing for a period of time. For example, the user terminal device 200 may start capturing according to a capturing command of a user, transmit a connection request signal and transmit an image captured by the capturing unit 220 to the electronic apparatus 100.

When authentication information on the connection request signal is received after the image is transmitted to the electronic apparatus 100, the processor 240 may control the communicator 230 to perform P2P communication with the electronic apparatus 100.

For example, when the authentication information is received, the processor 240 may perform the P2P communication with the electronic apparatus 100 according to the Bluetooth communication standard based on whether pairing is performed with the electronic apparatus 100 that transmits the authentication information and whether a Bluetooth module is activated. For another example, the processor 240 may perform the P2P communication with the electronic apparatus 100 through a WiFi P2P communication network.

As described above, the communicator 230 has been limited to one constituent element, but according to an embodiment, a plurality of communicators 230 may include a plurality of communication modules. For example, the first communicator may be embodied as a WiFi module, and the second communicator may be embodied as a Bluetooth module. In this case, the communicator 230 may perform communication with a network device through the first communicator, and perform communication with the electronic apparatus 100 through the second communicator.

Figure 3B:
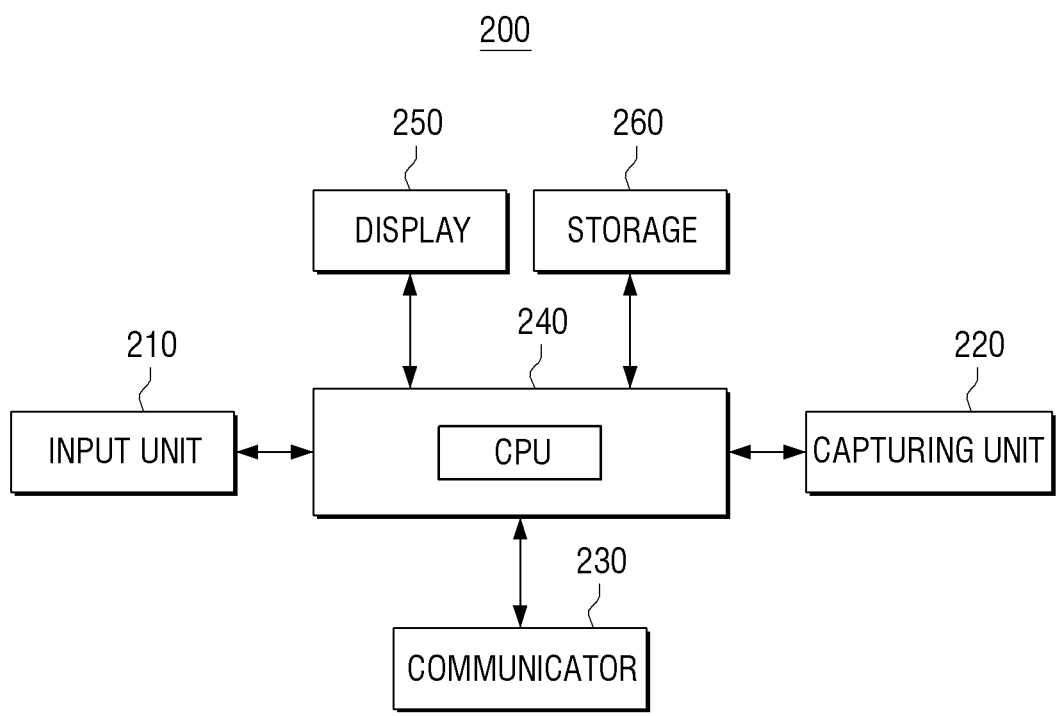
FIG. 3B is a block diagram illustrating an example of detailed configuration of a user terminal device.

FIG. 3B is a block diagram illustrating a detailed configuration of a user terminal device.

Referring to FIG. 3B, a user terminal device 200 may include an input device 210, a capturing unit 220, a communicator 230, a processor 240, a display 250 and a storage 260. The description of constituent elements shown in FIG. 3B, which has been made in FIG. 3A, will be omitted to avoid redundancy.

The capturing unit 220 may include modules such as an image sensor, for example, lens, CCD and CMOS, and an analog digital converter. The capturing unit 220 may obtain an image signal generated by capturing an object, convert the obtained image signal into a digital signal and transmit the digital signal to the processor 240. The processor 240 may perform an image processing operation for image processing such as noise filtering, color processing, etc. for the image converted into the digital signal. The processor 240 may provide a user with the captured image through the display 250.

The communicator 230 may be configured to perform communication with the AP, the electronic apparatus 100, and the server according to various types of communication methods. The communicator 230 may include a WiFi chip, a Bluetooth chip, a wireless communication chip, an NFC chip, and the like.

The Wi-Fi chip and the Bluetooth chip may perform communication using the WiFi method and the Bluetooth method, respectively. When a Wi-Fi chip or a Bluetooth chip is used, various connectivity information such as an SSID and a session key may be transmitted and received first, communication connection may be established based on the connectivity information, and various information may be transmitted and received. The communication chip may refer to a chip that performs communication according to various communication standards such as IEEE, ZigBee, 3rd Generation (3G), 3rd Generation Partnership Project (3GPP), Long Term Evolution (LTE), etc.

The processor 240 may control the overall operation of the user terminal device 200. The processor 240 may include one or more of a digital signal processor (DSP), a central processing unit (CPU), a controller, an application processor (AP), or a communication processor (CP), and an ARM processor, or may be defined by the term.

The processor 240 may include a ROM (or a non-volatile memory) having a control program for controlling the CPU and the user terminal device 200, and a RAM (or a volatile memory) that stores data input from the outside of the user terminal device 200 or is used as a storage area corresponding to various tasks performed by the user terminal device 200.

The CPU may access the storage 260 and perform booting by using an operation system (O/S) stored in the storage 260. In addition, the CPU may perform various operations by using various programs, contents, data, etc. stored in the storage 260.

The display 250 may display various types of images and may be embodied with a liquid crystal display (LCD), an organic light emitting diode (OLED), a plasma display panel (PDP), or the like.

The display 250 may display an image with respect to at least one electronic apparatus which has been connected. According to an embodiment, the processor 240 may display the images of the plurality of electronic apparatuses through the display 250 based on connection information stored in a storage 260. The images of the plurality of electronic apparatuses 100 may refer to a thumbnail image of the electronic apparatus 100, a shape image of the electronic apparatus, etc.

The storage 260 may store an operating system (O/S) software module for driving the user terminal device 200, and various data such as multimedia contents.

The storage 260 may be embodied as an internal memory such as ROM, RAM, etc. included in the processor 240, or embodied as a memory separated from the processor 240. The storage 150 may be embodied as a memory embedded in the user terminal device 200 according to data storage purpose, or embodied as a memory that can be detachably attached to the user terminal device 200. For example, data for driving the user terminal device 200 may be stored in a memory embedded in the user terminal device 200, and data for an expansion function of the user terminal device 200 may be stored in a memory that can be detachably attached to the user terminal device 200. A memory embedded in the user terminal device 200 may be implemented as a nonvolatile memory, a volatile memory, a hard disk drive (HDD), or a solid state drive (SSD), and a memory that can be detachably attached to user terminal device 200 may be implemented as a memory card (e.g., a micro SD card, a USB memory, etc.), an external memory that can be connected to a USB port (e.g., a USB memory), and the like.

The storage 260 may store connection information on another electronic device that has been already connected. For example, if authentication information is received from another electronic apparatus, and P2P communication is performed with another electronic apparatus based on the authentication information, the processor 240 may store connection information such as Mac Address on another electronic apparatus, and an image indicating another electronic apparatus in the storage 260.

The image indicating another electronic apparatus may refer to a thumbnail image of another electronic apparatus, an image indicating a form of another electronic apparatus, etc. When the user terminal device 200 enters a mode for performing connection with an external electronic device, the processor 240 may display an image through the display 250 based on connection information on another electronic device.

The processor 240, according to a predetermined command, based on the displayed being selected, may transmit connection information on another electronic apparatus corresponding to the selected image to the electronic apparatus 100 that performs P2P communication. For example, based on one of images displayed on the display 250 being selected during the P2P communication with the display apparatus 100-1, connection information on the speaker 100-2 corresponding to the selected image may be transmitted to the display apparatus 100-1. The display apparatus 100-1 may perform P2P communication with the speaker 100-2 based on the received connection information. The connection information may include authentication information on another electronic apparatus for the electronic apparatus 100 to perform P2P communication with another electronic apparatus.

The connection information according to an embodiment may include authentication information for an electronic apparatus to perform P2P communication with another electronic apparatus and function information of another electronic apparatus. The processor 240 may request function information of an electronic apparatus to an electronic apparatus that performs P2P communication, identify a function operable between an electronic apparatus and another electronic apparatus based on the function information of the electronic apparatus and the function information of another electronic apparatus, and provide the identified function through the display 250. For example, the processor 240 may identify a sound output function as a function operable between the display apparatus 100-1 and the speaker 100-2, and provide information that a sound signal included in a content output from the display apparatus 100-1 can be output through the speaker 100-2 through the display 250. The detailed description thereof will be made below.

FIG. 4 is a sequence diagram illustrating a controlling method for an electronic apparatus and a user terminal device according to an embodiment of the disclosure.

Referring to FIG. 4, a user terminal device 200 may transmit a connection request signal to an electronic apparatus 100 at S411.

Based on the connection request signal being received, the electronic apparatus 100 may store an image currently being output at S421.

The user terminal device 200 may capture a peripheral area of the user terminal device 200 at S421. For example, the user terminal device 200 may obtain an image by capturing a display 130 provided in the electronic apparatus 100 corresponding to a user's operation. However, the orders of S411 and S412 are not limited.

The user terminal device 200 may transmit an image to the electronic apparatus 100 after capturing an image for a period time. For example, the user terminal device 200 may transmit an image to a plurality of electronic apparatuses 100-1 to 100-5. According to another embodiment, an image may be transmitted only to the specific electronic apparatus 100.

The electronic apparatus 100 may compare an image stored at S421 with an image received from the user terminal device 200 at S422. For example, the display device 100-1 may store an image output through a display provided in the display apparatus 100-1, and compare the stored image with the received image from the user terminal device 200. The electronic apparatus 100 may identify an object in the received image is same as an object included in the stored image from the received image. According to an embodiment, the electronic apparatus may further identify whether a feature of the object included in the stored image is the same as a feature of the object identified in the received image. When a feature of an object included in the stored image is the same as a feature of an object identified in the received image at S423: Y, the electronic apparatus 100 may transmit authentication information on the connection request signal to the user terminal device 200 at S424.

According to an embodiment, when a connection request signal and a captured image are transmitted to the plurality of electronic apparatuses 100-1 to 100-5, S422 of comparing the stored image with the received image may be performed by the plurality of electronic apparatuses 100-1 to 100-5. For example, the display apparatus 100-1 may identify whether features of objects between two images are the same based on the image stored in the display apparatus 100-1 and the received image from the user terminal device 200, and if it is determined that the patterns are the same at S423: Y, the display apparatus 100-1 may transmit the authentication information to the user terminal device 200. The plurality of electronic apparatuses 100-2 to 100-5 may identify that the received object is not same as the respective mages stored in the electronic apparatuses, or identify that the features of objects are not the same at S423: N. In such a case, the authentication information on the electronic apparatuses 100-2 to 100-5 may not be transmitted to the user terminal device 200.

Figure 5:
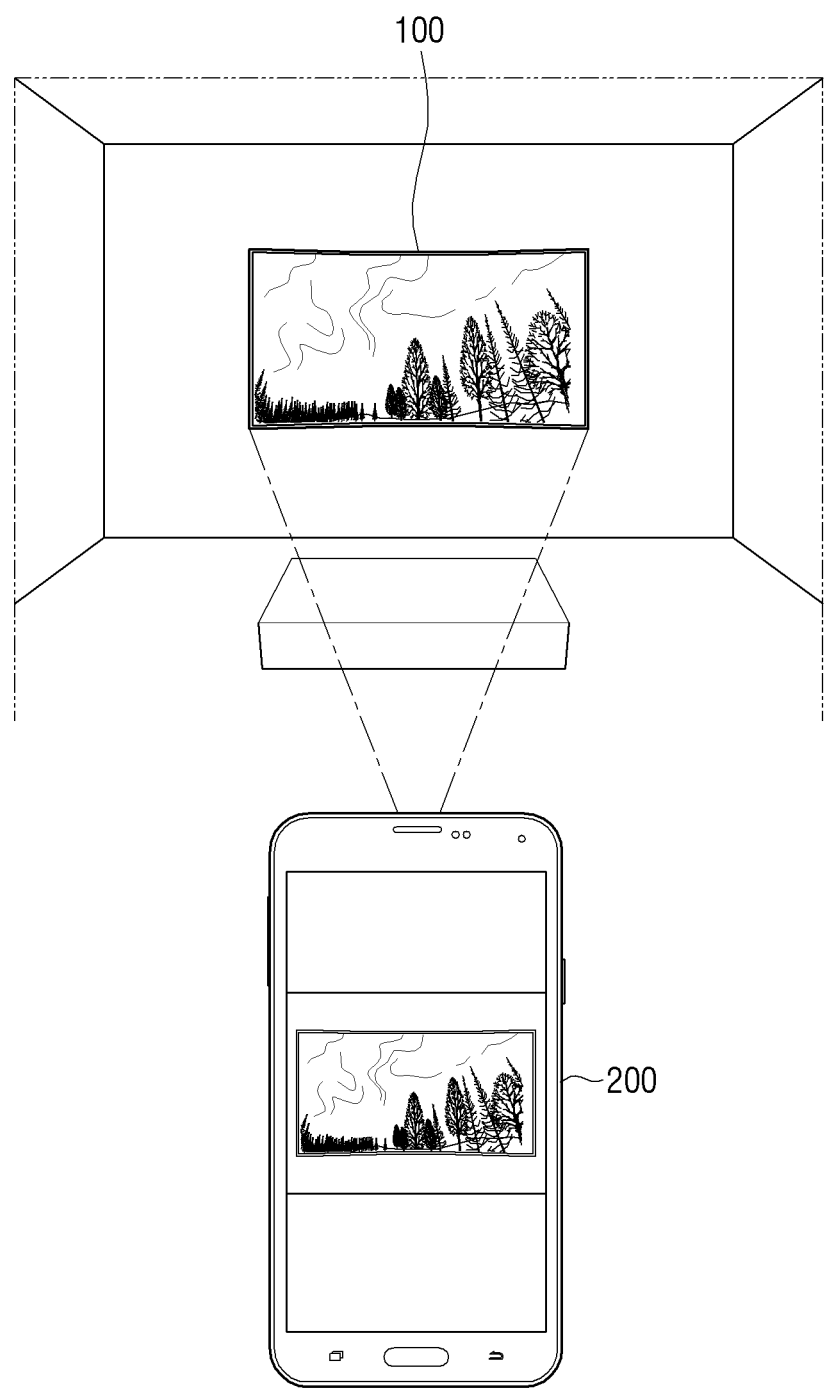
FIGS. 5 and 6 are views to explain a method for controlling between an electronic apparatus and a user terminal device according to an embodiment of the disclosure.
Figure 6:
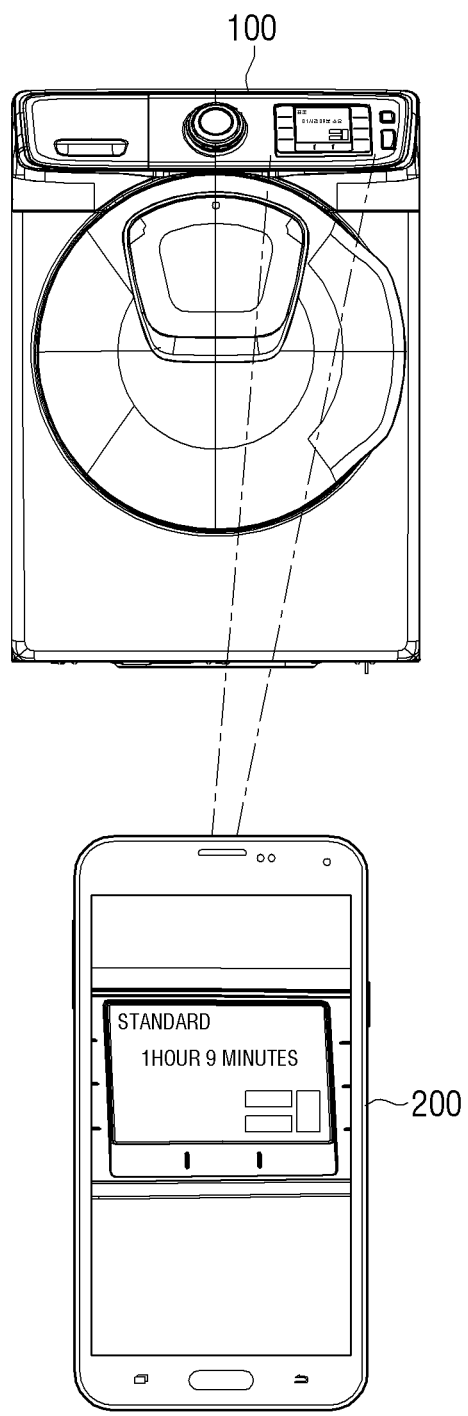

FIGS. 5 and 6 are views to explain a method for controlling between an electronic apparatus and a user terminal device according to an embodiment of the disclosure.

Referring to FIG. 5, an electronic apparatus 100 may be embodied as a display apparatus 100-1, and the display apparatus 100-1 may output an image. The user terminal device 200 may transmit a predetermined connection request signal to the display apparatus 100-1. The display apparatus 100-1, based on the predetermined connection request signal being received, may store an image being output through a display. The image being output through the display image may be transmitted to the speaker 100-2, the electric washing machine 100-4, the air conditioner, etc. and stored in the speaker 100-2, the electric washing machine 100-4, the air conditioner, in addition to being stored the display apparatus 100-1.

The user terminal device 200 may capture a display provided in the display apparatus 100-1 corresponding to a user operation. The image captured by the user terminal device 200 may be transmitted to the display apparatus 100-1. According to an embodiment, the image captured by the user terminal device 200 may be transmitted to the display apparatus 100-1 after a period of time has lapsed.

According to an embodiment, a predetermined connection request signal and a captured image may be transmitted to the speaker 100-2, the electric washing machine 100-4, the air conditioner, etc. in addition to the display apparatus 100-1.

Each of the display apparatus 100-1 and the plurality of electronic apparatuses 100-2 to 100-5 may compare the stored image with the received image, and identify whether the received image is the captured image corresponding to the respective electronic apparatus itself. For example, the display apparatus 100-1 may identify the same object (e.g., character, text information, etc.) as an object included in the stored image from the second image. When the same object is identified, the display apparatus 100-1 may determine whether a feature of an object included in the first image is the same as a feature of an object identified in the second image. When the features are the same, the display apparatus 100-1 may transmit authentication information on the predetermined connection request signal transmitted from the user terminal device 200 to the user terminal device 200. For example, when an image output through a display apparatus is a content A, and an image received through the user terminal device 200 is an image of a display outputting the content A, the display apparatus 100-1 may compare the received image with the stored image. When a certain section of the content A is included in the received image, and a certain section of the content A is included in the stored image the display apparatus 100-1 may determine that the feature is the same, and transmit the authentication information to the user terminal device 200.

According to an embodiment, the electronic apparatus 100 may identify whether the features of the stored image and the received image are the same based on various objects. For example, the electronic apparatus 100 may identify whether the features are the same based on the feature with respect to a brightness and an RGB color value of the stored image and the feature with respect to a brightness and an RGB color value of the received image. In addition, when the display apparatus 100 displays status information such as a channel number, a volume value, etc., in an OSD (On Screen Display) method, the electronic apparatus 100 may identify a feature such as a channel number, a volume value, etc. from the received image, and identify whether the feature is the same as a feature such as a channel number, a volume value, etc., of the stored image. For example, when a feature of a channel number (e.g., Ch. 9), and a feature of a volume value (e.g., Vol. 10) are the same in the received image and the stored image, the electronic apparatus 100 may transmit the authentication information to the user terminal device 200. When the authentication information is transmitted to the user terminal device 200, the user terminal device 200 may perform P2P communication with the electronic apparatus 100.

According to another embodiment, the processor 140 may identify a plurality of objects in the second image are same as a plurality of objects included in the stored first image. The plurality of objects may refer to images respectively included in the first and second images, text information, figures, RGB information of each of the first and second images, etc. For each of the plurality of same objects identified in the first image and the second image, the processor 140 may determine whether a feature of each of the plurality of objects included in the first image is the same a feature of the corresponding object, among the plurality objects, in the second image. According to an embodiment, the features of the plurality of objects may be a dynamic feature, which may change according to the operation of the respective electronic apparatus.

For example, when a channel number changes from Ch. 9→Ch. 10, and a feature of a volume value (e.g., Vol. 10→Vol. 15) are the same in the received image and the stored image, the electronic apparatus 100 may transmit the authentication information to the user terminal device 200. When the authentication information is transmitted to the user terminal device 200, the user terminal device 200 may perform P2P communication with the electronic apparatus 100.

According to another embodiment, each of the first image stored in the electronic apparatus 100 and the second image received through the communicator 110 may include multiple images. For example, the first image may include multiple first images in a sequence and the second image may include multiple second images in a sequence.

According to an embodiment, in which the first image and the second image respectively include multiple images, the processor 140 may determine whether a pattern of change when a channel number changes from Ch. 9→Ch. 10 or when a volume value changes from Vol. 10→Vol. 15 in the received second image is same as the pattern of change in the stored image. Based on determining that the pattern of change is the same, the electronic apparatus 100 may transmit the authentication information to the user terminal device 200. When the authentication information is transmitted to the user terminal device 200, the user terminal device 200 may perform P2P communication with the electronic apparatus 100.

According to an embodiment, the electronic apparatus 100 may give control authority to the user terminal device 200. In this case, the electronic apparatus 100 may be controlled by the user terminal device 200.

According to an embodiment, the electronic apparatus 100 may transmit status information of the electronic apparatus 100 to the user terminal device 200, and the user terminal device 200 may provide a user with the status information of the electronic apparatus 100 (e.g., channel information, volume information, contents information, etc.). Referring to FIG. 6, the electronic apparatus 100 may be embodied as the electric washing machine 100-4. According to an embodiment, the electric washing machine 100-4 may provide the user with its status information through a display. For example, the electric washing machine 100-4 may display information on a washing course, a remaining washing time, an elapsed washing time, etc. Based on a connection request signal being received from the user terminal device 200, the electric washing machine 100-4 may store the status information being displayed.

Referring to FIG. 6, the electric washing machine 100-4 may display information on the washing course and the remaining washing time, and the user terminal device 200 may obtain an image by capturing status information displayed by the electric washing machine 1004 according to a user operation.

The user terminal device 200 may transmit an image to the electric washing machine 100-4. According to an embodiment, the user terminal device 200 may transmit the image to the electric washing machine 100-4 after a period predetermined time passes. The electric washing machine 100-4 may compare an image stored according to a connection request signal with an image received from the user terminal device 200. For example, when the washing course 'standard' and '01 hours 09 minutes' are identified in the received image, and the washing course 'standard' and '01 hours 09 minutes' are identified in the image stored in the electric washing machine 100-4, the electric washing machine 100-4 may transmit authentication information to the user terminal device 200.

Accordingly, the user terminal device 200 may perform P2P communication with the electric washing machine 100-4.

Figure 7:
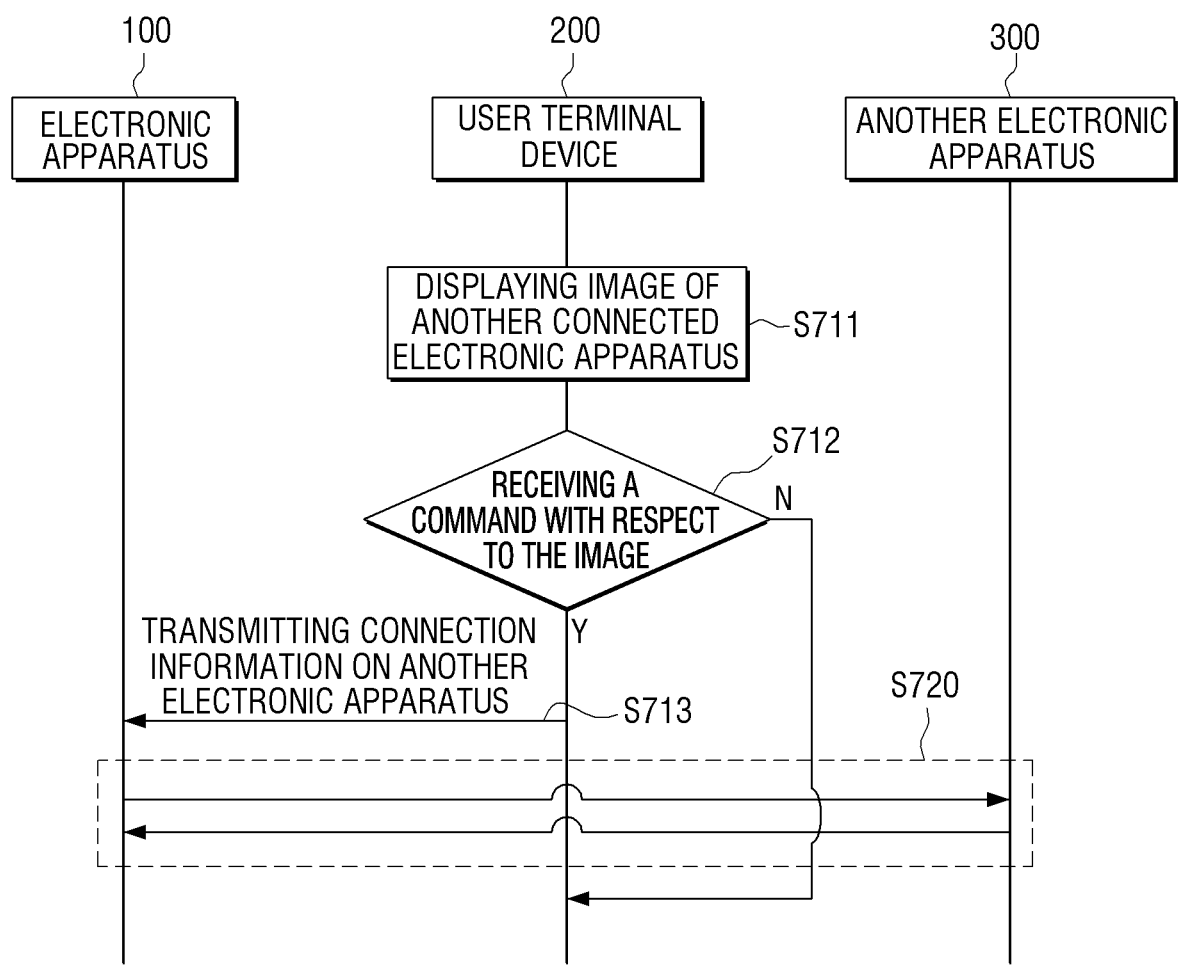
FIG. 7 is a sequence diagram to explain a method for communication connection between electronic apparatuses according to an embodiment of the disclosure.

FIG. 7 is a sequence diagram illustrating a method for communication connection between electronic apparatuses according to an embodiment of the disclosure.

According to an embodiment, the user terminal device 200 may store connection information on another electronic apparatus 300 that has been already connected. The connection information may include authentication information such as a security key and a setting value required for connection with another electronic apparatus 300 and function information on the another electronic apparatus 300.

According to an embodiment, the user terminal device 200 may display an image of another electronic apparatus 300 that has been already connected at S711. For example, the user terminal device 200 may display a thumbnail image or a shape image of another electronic apparatus 300 based on pre-stored connection information.

When a command with respect to the displayed image is received at S712: Y, the user terminal device 200 may transmit the connection information on another electronic apparatus 300 corresponding to an image to the electronic apparatus 100 at S713. For example, based on a user command for selecting an image being received during P2P communication between the electronic apparatus 100 and the user terminal device 200, the connection information on the another electronic apparatus 300 corresponding to the image may be transmitted to the electronic apparatus 100.

The electronic apparatus 100 may perform P2P communication with another electronic apparatus 300 based on the received connection information on another electronic apparatus 300 at step S720.

FIGS. 8 and 9 are views illustrating a method for communication connection between electronic apparatuses according to an embodiment of the disclosure.

Referring to FIG. 8(*a*), the user terminal device 200 may store connection information of the display apparatus 100-1 after performing connection with the display apparatus 100-1.

Referring to FIG. 8(*b*), when the user terminal device 200 enters a mode for performing connection with an external electronic apparatus, the user display apparatus 200 may display an image corresponding to the display apparatus 100-1 has been already connected. In addition, a peripheral area of the user terminal device 200 may be captured through the capturing unit 220 of the user terminal device 200. Referring to FIG. 8(*b*), for convenience of explanation, it is assumed that the speaker 100-2 is captured. According to another embodiment, the speaker 100-2 or any of the other electronic apparatuses may be selected for connection using a different method.

According to a command with respect to the user terminal device 200, the user terminal device 200 may transmit connection information on the display apparatus 100-1 to a speaker. For example, when an image of the display apparatus 100-1 and an image of the displaying speaker 100-2 are pinched in, the user terminal device 200 may transmit the connection information on the display apparatus 100-1 to the speaker 100-2. However, the predetermined command is not limited to a pinch-in operation, but could be various touch operations.

Referring to FIG. 8(*c*), the speaker 100-2, based on the connection information of the display apparatus 100-1 being received from the user terminal device 200, may perform P2P communication with the display apparatus 100-1. In other words, although a user does not directly operate the display apparatus 100-1 or the speaker 100-2, two different electronic apparatuses may perform P2P communication through the operation on the user terminal device 200.

FIG. 9 is a view illustrating a method for communication connection between electronic apparatuses according to another embodiment of the disclosure.

Referring to FIGS. 9(*a*), 9(*b*) and 9(*c*), as operations S711, S712 and S713 shown in FIG. 7 are performed, P2P communication between the refrigerator 100-3 and the display apparatus 100-1 may be performed. In other words, it is assumed that the electronic apparatus 100 is embodied as the display apparatus 100-1, and another electronic apparatus 300 that has been already connected is embodied as the refrigerator 100-3.

According to an embodiment, when P2P communication between the display apparatus 100-1 and the refrigerator 100-3 is performed, status information, contents, etc. output through a display provided in the refrigerator 100-3 may be output through the display apparatus 100-1.

For example, the display apparatus 100-1 may request function information of the refrigerator 100-3 to the refrigerator 100-3, and identify a function operable in association with the refrigerator 100-3 based on the function of the display apparatus 100-1 and function information of the refrigerator 100-3. For example, when the function information of the refrigerator 100-3 includes a display function, the display apparatus 100-1 may identify that a mirroring function between the display apparatus 100-1 and the refrigerator 100-3 is possible, receive an image displayed on the refrigerator 100-3, and perform the mirroring function.

FIG. 10 is a view illustrating a controlling method for an electronic apparatus according to an embodiment of the disclosure.

When the user terminal device 200 receives a response signal from the electronic apparatus 100, connection between the user terminal device 200 and the electronic apparatus 100 may be performed.

According to an embodiment, the user terminal device 200 may control the electronic apparatus 100 that has been connected. For example, referring to FIGS. 10(*b*) and 10(*c*), the user terminal device 200 may be connected to the robot vacuum cleaner 100-5. In this case, a function displayed on the user terminal device 200 may be selected to control the robot vacuum cleaner 100-5. For example, a charge return command may be transmitted to the robot vacuum cleaner 100-5 through the user terminal device 200.

As described above, the user terminal device 200 may display an image of the electronic apparatus that has been connected. For example, referring to FIG. 10(*a*), when the user terminal device 200 is connected to a robot vacuum cleaner after being connected to the display apparatus 100-1, the user terminal device 200 may display an image corresponding to the display apparatus 100-1.

Referring to FIGS. 10(*d*) and 10(*e*), according to a user command for an image corresponding to the display apparatus 100-1, the user terminal device 200 may perform reconnection with the display apparatus 100-1, not with the robot vacuum cleaner 100-5. In this case, the user terminal device 200 may perform reconnection with the display apparatus 100-1 based on the pre-stored connection information on the display apparatus 100-1 as described above. When the user terminal device 200 is reconnected to the display apparatus 100-1, a UI for controlling the function of the display apparatus 100-1 (e.g., volume up and down) may be displayed on the user terminal device 200.

Figure 11:
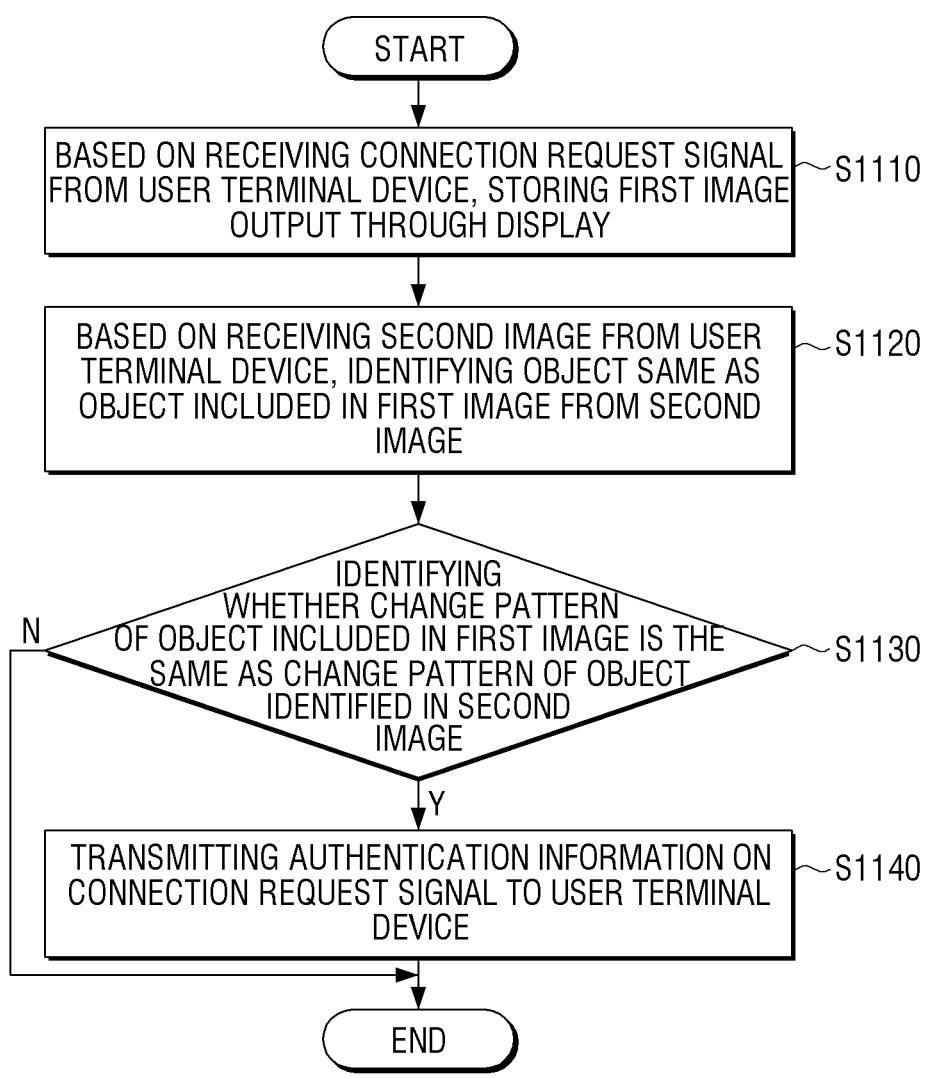
FIG. 11 is a flowchart to explain a controlling method for an electronic apparatus according to an embodiment of the disclosure.

FIG. 11 is a flowchart to explain a controlling method for an electronic apparatus according to an embodiment of the disclosure.

Based on a connection request signal being received from a user terminal device, an electronic apparatus according to an embodiment of the disclosure may store a first image output through a display at S1110.

Based on a second image being received from a user terminal device, the same object as an object included in the first image may be identified from the second image at S1120.

When a feature of an object included in the first image is the same as a feature of an object identified in the second image at S1130: Y, authentication information on a connection request signal may be transmitted to a user terminal device at S1140.

Figure 12:
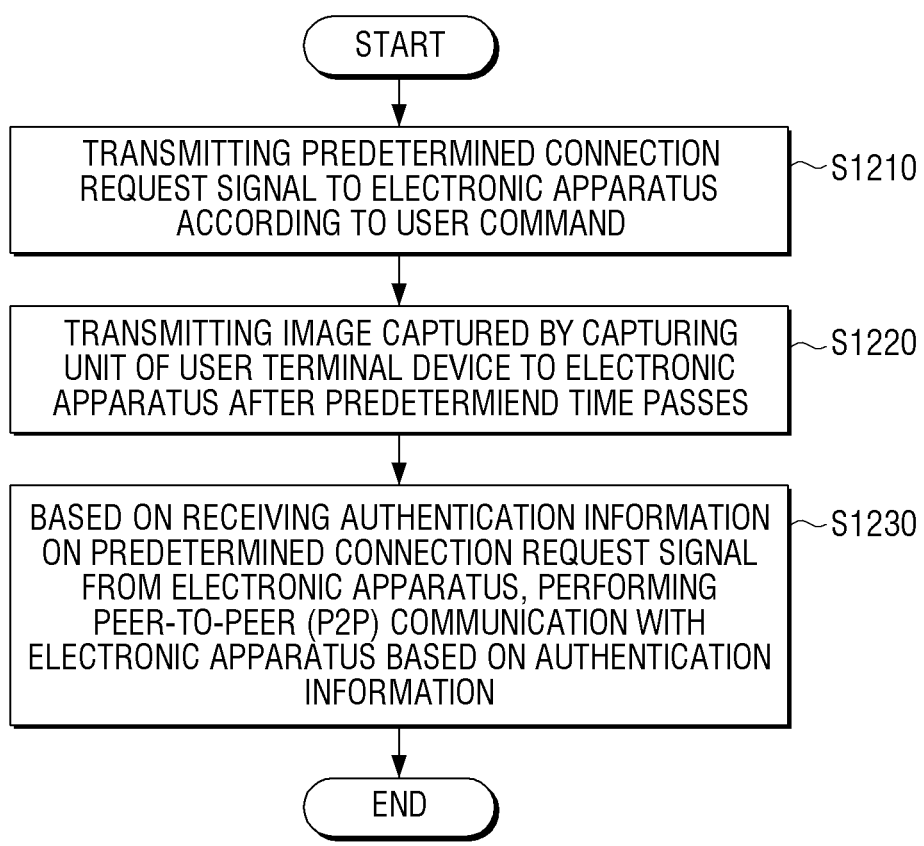
FIG. 12 is a flowchart to explain a controlling method for a user terminal device according to an embodiment of the disclosure.

FIG. 12 is a flowchart to explain a controlling method for a user terminal device according to an embodiment of the disclosure.

A connection request signal may be transmitted to an electronic apparatus according to a user command at S1210.

An image captured by a capturing unit of a user terminal device may be transmitted after a time passes at S1220.

Based on authentication information on the connection request signal being received from the electronic apparatus, peer-to-peer (P2P) communication with an electronic apparatus may be performed based on authentication information at S1230.

At S1210 of transmitting the connection request signal to the electronic apparatus, the connection request signal may be broadcasted to the electronic apparatus through a network device to which the user terminal device is connected, and at S1220 of transmitting the captured image to the electronic apparatus, an image captured by the network device may be broadcasted to the electronic apparatus after a period of time has lapsed.

At S1220 of transmitting the captured image to the electronic apparatus, capturing may be started according to a capturing command of a user, and an image captured by the capturing unit may be transmitted to the electronic apparatus after the connection request signal is transmitted.

A user terminal device may include connection information on another electronic apparatus that has been connected, and a controlling method according to an embodiment of the disclosure may further include, displaying an image of another electronic apparatus based on connection information on the another electronic apparatus when entering a mode for performing connection with an external electronic apparatus.

A controlling method according to an embodiment of the disclosure may further include transmitting connection information on another electronic apparatus to an electronic apparatus according to a command, and the connection information may include authentication information for a an electronic apparatus to perform P2P communication with the another electronic apparatus.

For another example, the connection information may include authentication information for an electronic apparatus to perform P2P communication with another electronic apparatus, and function information on another electronic apparatus, and a step of requesting function information of an electronic apparatus to the electronic apparatus may further include identifying a function operable between an electronic apparatus and another electronic apparatus based on function information of the electronic apparatus and function information of the another electronic apparatus, and displaying the identified function.

The various embodiments described above may be implemented in a recording medium that can be read by a computer or a similar device using software, hardware, or a combination thereof. In some cases, embodiments described herein may be implemented by a processor itself. According to software implementation, embodiments such as the procedures and functions described herein may be implemented in separate software modules. According to some embodiments, software (e.g., the program) may contain one or more instructions that are stored in a machine (i.e., computer) readable storage medium (i.e., internal memory) or external memory. Each of the software modules may perform one or more of the functions and operations described herein.

Meanwhile, computer instructions for performing the processing operations of the sound output apparatus 100 according to various embodiments of the disclosure described above may be stored in a non-transitory computer-readable medium. The computer instructions stored in the non-volatile computer-readable medium cause a specific apparatus to perform the processing operations in the sound output apparatus 100 according to the various embodiments described above when executed by the processor of the specific apparatus.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although exemplary embodiments have been shown and described, it will be appreciated by those skilled in the art that changes may be made to these exemplary embodiments without departing from the principles and spirit of the disclosure. Accordingly, the scope of the disclosure is not construed as being limited to the described exemplary embodiments, but is defined by the appended claims as well as equivalents thereto.

What is claimed is:

1. An electronic apparatus, comprising:
a communication circuit;
a storage;
a display; and
a hardware processor configured to:
control the display to display status information indicating a current operating state of the electronic apparatus,
based on a connection request signal being received from a user terminal device through the communication circuit, obtain a first image by storing a screen including the status information after receiving the connection request signal, the screen being output through the display,
based on a second image being received from the user terminal device through the communication circuit, identify a first object included in the stored first image that is same as second object included in the received second image, and
based on an identification that a first feature of the first object is same as a second feature of the second object, control the communication circuit to transmit authentication information corresponding to the connection request signal to the user terminal device.

2. The electronic apparatus as claimed in claim 1, wherein the processor is further configured to receive the connection request signal transmitted through a network device to which the communication circuit is connected, and control the communication circuit to perform peer-to-peer (P2P) communication with the user terminal device according to authenticated communication connection request from the user terminal device based on the authentication information.

3. The electronic apparatus as claimed in claim 1, wherein the first object is at least one of text information and RGB information included in the first image and the second object is at least one of text information and RGB information included in the second image.

4. The electronic apparatus as claimed in claim 1, wherein the processor is further configured to perform communication with another electronic apparatus based on authentication information of the another electronic apparatus received from the user terminal device.

5. The electronic apparatus as claimed in claim 4, wherein the processor is further configured to:

control the communication circuit to transmit, to the another electronic apparatus, a request for information about a function of the another electronic apparatus, based on the information about the function being received, identify a function operable in association with the another electronic apparatus according to a function of the electronic apparatus and the information about the function of the another electronic apparatus, and perform the identified function.

6. The electronic apparatus as claimed in claim 5, wherein the processor is further configured to, based on an identification that the function of the electronic apparatus includes a display function and the function of the another electronic apparatus includes a display function, identify that a mirroring function with the another electronic apparatus is possible, receive a third image displayed on the another electronic apparatus, and perform the mirroring function.

7. The electronic apparatus as claimed in claim 1, wherein the processor is further configured to identify a first pattern of change of the first object as the first feature and a second pattern of change of the second object as the second feature, based on the identification that the first pattern is same as the second pattern, control the communication circuit to transmit the authentication information to the user terminal device.

8. A user terminal device, comprising:
an input circuit;
a camera;
a communication circuit; and
a hardware processor configured to:
transmit a connection request signal to an electronic apparatus through the input circuit according to a user command,
transmit a first image captured by the camera to the electronic apparatus corresponding to the connection request signal, the first image corresponding to a screen including status information indicating a current operating state of the electronic apparatus, the screen being output through the electronic apparatus and stored after receiving the connection request signal,
receive authentication information based on the first image transmitted to the electronic apparatus, and
based on the authentication information on the connection request signal being received from the electronic apparatus, perform peer-to-peer (P2P) communication with the electronic apparatus based on the authentication information.

9. The user terminal device as claimed in claim 8, wherein the processor is further configured to control the communication circuit to broadcast the connection request signal to the electronic apparatus through a network device to which the communication circuit is connected, and control the communication circuit which broadcasts the first image to the electronic apparatus through the network device after a predetermined time has elapsed.

10. The user terminal device as claimed in claim 8, wherein the processor is further configured to control the camera to perform capturing for a period of time after transmitting the connection request signal.

11. The user terminal device as claimed in claim 8, wherein the processor is further configured to control the camera to start capturing the first image according to a capturing command of a user, and control the communication circuit to transmit the first image captured by the camera to the electronic apparatus after transmitting the connection request signal.

12. The user terminal device as claimed in claim 8, further comprising:
a display; and
a storage configured to store connection information on another connected electronic apparatus,
wherein the processor is further configured to, based on entering a mode for performing connection with an external electronic apparatus, control the display to display a second image of the another connected electronic apparatus on the display based on information stored in the storage.

13. The user terminal device as claimed in claim 12, wherein the processor is further configured to control the communication circuit to transmit the connection information on the another electronic apparatus to the electronic apparatus according to a predetermined command and wherein the connection information includes authentication information for the electronic apparatus to perform P2P communication with the another electronic apparatus.

14. The user terminal device as claimed in claim 12, wherein the connection information includes authentication information for the electronic apparatus to perform P2P communication with the another electronic apparatus and information about a function of the another electronic apparatus, and wherein the processor is further configured to:
request information about a function of the electronic apparatus to the electronic apparatus,
identify a function operable between the electronic apparatus and the another electronic apparatus based on the information about the function of the electronic apparatus and the information about the function of the another electronic apparatus, and
provide the identified function to the display.

15. A controlling method for a user terminal device, the method comprising:
transmitting a connection request signal to an electronic apparatus according to a user command;
transmitting a first image captured by a camera of the user terminal device to the electronic apparatus corresponding to the connection request signal, the first image corresponding to a screen including status information indicating a current operating state of the electronic apparatus, the screen being outputted through the electronic apparatus and stored after receiving the connection request signal;
receiving authentication information based on the first image transmitted to the electronic apparatus; and
based on the authentication information on the connection request signal being received from the electronic apparatus, performing peer-to-peer (P2P) communication with the electronic apparatus based on the authentication information.

16. The method as claimed in claim 15, wherein the transmitting of the connection request signal to the electronic apparatus comprises broadcasting the connection request signal to the electronic apparatus through a network device to which the user terminal device is connected, and wherein the transmitting of the first image to the electronic apparatus comprises broadcasting the first image to the electronic apparatus through the network device after a predetermined time has elapsed.

17. The method as claimed in claim 15, wherein the transmitting of the first image to the electronic apparatus comprises starting capturing according to a capturing command of a user, and transmitting the first image captured by the camera to the electronic apparatus after transmitting the connection request signal.

18. The method as claimed in claim 15, wherein the user terminal device includes connection information on another connected electronic apparatus, and
   wherein the method further comprises, based on entering a mode for performing connection with an external electronic apparatus, displaying a second of the another electronic apparatus based on connection information on the another electronic apparatus.

19. The method as claimed in claim 18, further comprising:
   transmitting the connection information on the another electronic apparatus to the electronic apparatus according a predetermined command,
   wherein the connection information includes authentication information for the electronic apparatus to perform P2P communication with the another electronic apparatus.

* * * * *